United States Patent [19]

Lund et al.

[11] Patent Number: 5,160,386

[45] Date of Patent: Nov. 3, 1992

[54] GAS GENERANT FORMULATIONS CONTAINING POLY(NITRITO) METAL COMPLEXES AS OXIDANTS AND METHOD

[75] Inventors: Gary K. Lund, Ogden, Utah; Mikel R. Stevens, Fayetteville, Ark.

[73] Assignee: Morton International, Inc., Chicago, Ill.

[21] Appl. No.: 787,500

[22] Filed: Nov. 4, 1991

[51] Int. Cl.$^5$ ............................................. C06B 25/00
[52] U.S. Cl. .................................. 149/88; 149/109.4; 149/19.5; 149/35; 149/45
[58] Field of Search ............................. 149/109.4, 88

[56] References Cited

U.S. PATENT DOCUMENTS

| | | | |
|---|---|---|---|
| 2,981,616 | 4/1961 | Boyer | 149/35 |
| 3,055,911 | 9/1962 | Finnegan et al. | 260/308 |
| 3,348,985 | 10/1967 | Stadler et al. | 149/2 |
| 3,468,730 | 9/1969 | Gawlick et al. | 149/61 |
| 3,719,604 | 3/1973 | Prior | 252/186 |
| 3,734,789 | 5/1973 | Moy et al. | 149/19 |
| 3,739,574 | 6/1973 | Godfrey | 60/39.03 |
| 3,741,585 | 6/1973 | Henrickson et al. | 149/35 |
| 3,814,694 | 6/1974 | Klager et al. | 252/186 |
| 3,862,866 | 1/1975 | Timmerman et al. | 149/21 |
| 3,898,112 | 8/1975 | Strecker et al. | 149/92 |
| 3,904,221 | 9/1975 | Shiki et al. | 280/150 AB |
| 3,909,322 | 9/1975 | Chang et al. | 149/92 |
| 3,912,561 | 10/1975 | Doin et al. | 149/35 |
| 3,931,040 | 1/1976 | Breazeale | 149/35 |
| 3,947,300 | 3/1976 | Passaner et al. | 149/35 |
| 3,996,079 | 12/1976 | DiValentin | 149/35 |
| 4,021,275 | 3/1977 | Kishi et al. | 149/35 |
| 4,062,708 | 12/1977 | Goetz | 149/35 |
| 4,203,787 | 5/1980 | Kirchoff et al. | 149/35 |
| 4,243,443 | 1/1981 | Ultracki | 149/35 |
| 4,296,084 | 10/1981 | Adams et al. | 423/351 |
| 4,369,079 | 1/1983 | Shaw | 149/35 |
| 4,370,181 | 1/1983 | Lunstrom et al. | 149/109.2 |
| 4,376,002 | 3/1983 | Ultracki | 149/35 |
| 4,547,235 | 10/1985 | Schreiter et al. | 149/35 |
| 4,696,705 | 9/1987 | Hamilton | 149/35 |
| 4,734,141 | 3/1988 | Cartwright et al. | 149/35 |
| 4,865,667 | 9/1989 | Zeuner et al. | 149/22 |
| 4,931,112 | 6/1990 | Wardle et al. | 149/88 |
| 5,015,309 | 5/1991 | Wardle et al. | 149/19.1 |
| 5,019,220 | 5/1991 | Taylor et al. | 149/35 |
| 5,089,069 | 2/1992 | Psamaswamy et al. | 149/21 |

Primary Examiner—Stephen J. Lechert, Jr.
Attorney, Agent, or Firm—L. Dewayne Rutledge; Gerald K. White

[57] ABSTRACT

Gas generating compositions or propellants are provided which comprise a fuel and a novel oxidizer therefor comprising an inorganic compound having a poly(-nitrito) transition metal complex anion. The inorganic oxidant compounds are generically represented by the formula:

$$M_x^1 M_y^2 (NO_2)_z$$

wherein (1) $M^1$ is a metal selected from the (a) Group IA alkali metals, (b) Group IIA alkaline earth metals, preferably strontium, (c) Group IB metals, preferably copper, and (d) Group IIB metals, preferably zinc, of the Periodic Table, (2) $M^2$ is a metal selected from the transition metals of Groups IVA-IIB of the Periodic Table, (3) $x=1, 2, 3,$ or $4$; $y=1$ or $2$, and $z=4$ or $6$ as determined by the required stoichiometry of the metals of the complex, and (4) the $M^1$ and $M^2$ metals selected are different metals. $M^1$ is preferably the Group IA alkali metals, more preferably sodium and potassium, and most preferably potassium. $M^2$ is preferably the Group VIIIA, IB and IIB metals, more preferably cobalt, copper and zinc from the respective Groups, and most preferably cobalt. The most preferred oxidant is potassium hexanitrocobaltate, $K_3Co(NO_2)_6$. Preferred alternate oxidizers are potassium tetranitrocuprate, $K_2Cu(NO_2)_4$, and potassium tetranitrozincate, $K_2Zn(NO_2)_4$.

31 Claims, 1 Drawing Sheet

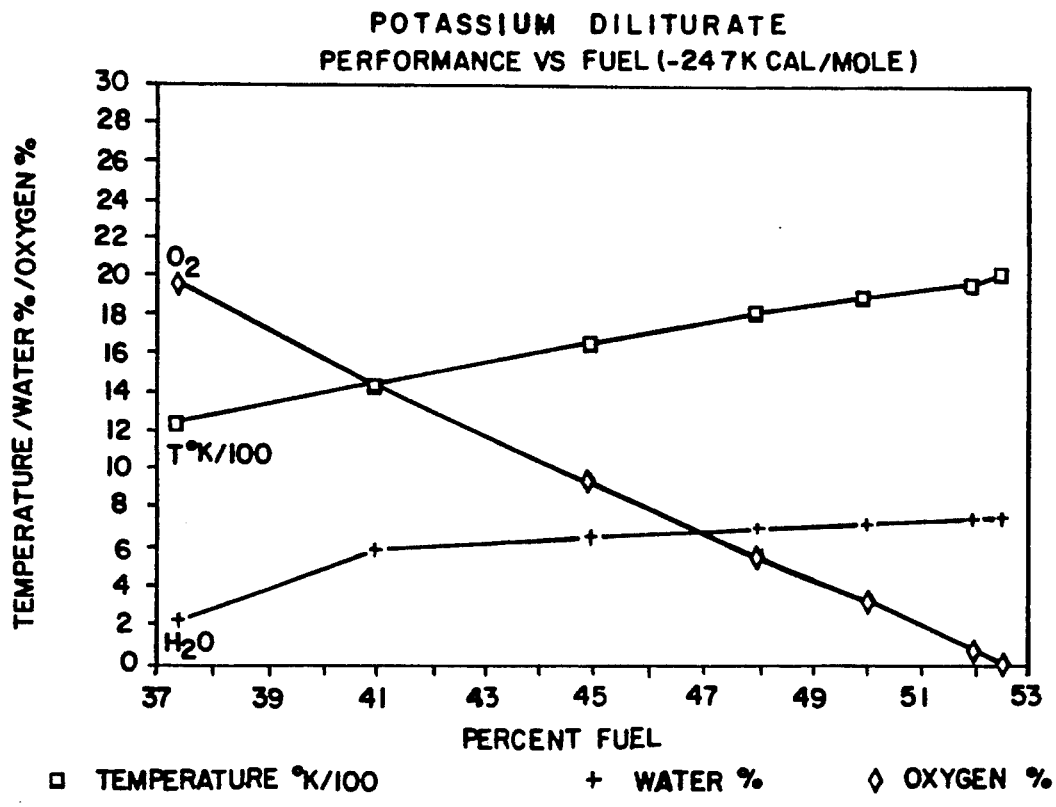
Fig. 1 (EXAMPLE 2)
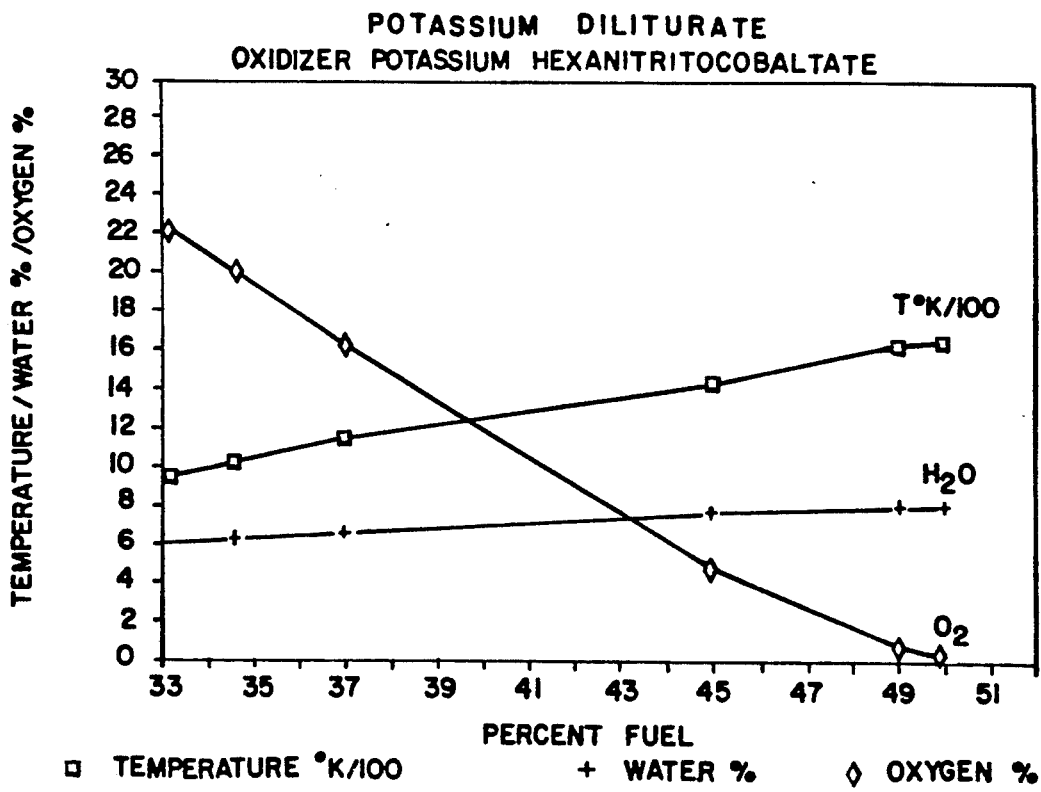
Fig. 2 (EXAMPLE 3)

GAS GENERANT FORMULATIONS CONTAINING POLY(NITRITO) METAL COMPLEXES AS OXIDANTS AND METHOD

BACKGROUND OF THE INVENTION

1. Field of the Invention

This invention relates to gas generant or propellant compositions, generally in pellet, tablet or wafer form, which are burned at relatively low temperatures to provide nitrogen rich gas to inflate automobile air bag restraint systems. More particularly, this invention relates to improved gas generant compositions including a fuel for producing the nitrogen rich gas, especially non-azides, and a novel oxidizer therefor comprising an inorganic compound having a poly(nitrito) transition metal complex anion.

Though the gas generant or propellant compositions of this invention are especially designed and suited for creating nitrogen-containing gas for inflating passive restraint vehicle crash bags, they would function equally well in other less severe inflation applications, such as aircraft slides and inflatable boats; and more generally, would find utility for any use where a low temperature, non-toxic gas is needed, such as for a variety of pressurization and purging applications, as in fuel and oxidizer tanks in rocket motors; for various portable and military equipment and operations where a storable source of gas is needed.

2. Description of the Prior Art

Automobile air bag systems have been developed to protect the occupant of a vehicle, in the event of a collision, by rapidly inflating a cushion or bag between the vehicle occupant and the interior of the vehicle. The inflated air bag absorbs the occupant's energy to provide a gradual, controlled ride down, and provides a cushion to distribute body loads and keep the occupant from impacting the hard surfaces of the vehicle interior.

The use of protective gas-inflated bags to cushion vehicle occupants in crash situations is now widely known and well documented. In early systems of this type, a quantity of compressed, stored gas was employed to inflate a crash bag which, when inflated, was positioned between the occupant and the windshield, steering wheel and dashboard of the vehicle. The compressed gas was released by the action of actuators or sensors which sensed a rapid change in velocity of the vehicle during a rapid impact, as would normally occur during an accident. Because of the bulk and weight of such stored, compressed gas systems, their generally slow reaction time and attendant maintenance difficulties, these type systems are now largely obsolete, having been superseded by air bag systems utilizing a gas generated by chemical gas-generating compositions. These advanced systems involve the use of an ignitable propellant composition for inflating the air cushion, wherein the inflating gas is generated by the exothermic reaction of the reactants which form the propellant.

The most common air bag systems presently in use include an on-board collision sensor, an inflator, and a collapsed, inflatable bag connected to the gas outlet of the inflator. The inflator typically has a metal housing which contains an electrically initiated igniter, a gas generant composition, for example, in pellet or tablet form, and a gas filtering system. Before it is deployed, the collapsed bag is stored behind a protective cover in the steering wheel (for a driver protection system) or in the instrument panel (for a passenger system) of the vehicle. When the sensor determines that the vehicle is involved in a collision, it sends an electrical signal to the igniter, which ignites the gas generant composition. The gas generant composition burns, generating a large volume of relatively cool gaseous combustion products in a very short time. The combustion products are contained and directed through the filtering system and into the bag by the inflator housing. The filtering system retains all solid and liquid combustion products within the inflator and cools the generated gas to a temperature tolerable to the vehicle passenger. The bag breaks out of its protective cover and inflates when filled with the filtered combustion products emerging from the gas outlet of the inflator. See, for example, U.S. Pat. No. 4,296,084.

The requirements of a gas generant suitable for use in an automobile air bag are very demanding. The gas generant must burn very fast to inflate the air bag, for example, in about 30 milliseconds or less, but the burn rate must be stable, controllable and reproducible to ensure bag deployment and inflation in a manner which does not cause injury to the vehicle occupants or damage to the bag.

The gas generant must be extremely reliable during the life of the vehicle (ten years or more). Ignition must be certain, and the burn rate of the gas generant composition must remain constant despite extensive exposure of the composition to vibration and a wide range of temperatures. The gas generant is protected from moisture when sealed in the inflator, but should still be relatively insensitive to moisture to minimize problems during manufacture and storage of the gas generant and assembly of the inflator, and to ensure reliability during the life of the air bag system.

The gas generant must efficiently produce cool, non-toxic, non-corrosive gas which is easily filtered to remove solid or liquid particles, and thus to preclude injury to the vehicle occupants and damage to the bag.

It follows then that the most desirable atmosphere inside an inflated crash bag would correspond in composition to the air outside it. This has thus far proven impractical to attain. The next best solution is inflation with a physiologically inert or at least innocuous gas. The one gas which possesses the required characteristics and which has proven to be the most practical is nitrogen.

The most successful to date of the prior art solid gas generants which produce nitrogen that are capable of sustained combustion have been based upon the decomposition of compounds of alkali metal, alkaline earth metal and aluminum derivatives of hydrazoic acid, especially sodium azide. Such azide-containing gas generants are disclosed in, for example, U.S. Pat. Nos. 2,981,616; 3,741,585; 4,062,708; 4,203,787; 4,243,443 and 4,547,235.

There are some disadvantages, however, to the use of azides in gas generant compositions used for inflating air bag systems. For instance, sodium azide is a Class B poison and is a highly toxic material. It is easily hydrolyzed, particularly during typical wet slurrying preparation, forming hydrazoic acid which acid is not only a highly toxic and explosive gas, but also readily reacts with such metal ions as Mg, Ca, Mn, Fe, Cu and Pb to form extremely sensitive solids that are subject to unexpected ignition or detonation. See, for example U.S. Pat. No. 5,019,220. Especially careful handling in the manufacture, storage and eventual disposal of such materials is required to safely handle them and the azide-containing gas generants prepared from them.

A number of approaches to a non-azide nitrogen gas generant have been investigated in the prior art as disclosed, for example, in U.S. Pat. Nos. 3,055,911; 3,348,985; 3,739,574; 3,912,561; 4,369,079 and 4,370,181. Many of the prior art nitrogen-containing gas generants that have been reported are based upon nitrogen-containing organic compounds, such as those derived from the various hydroxylamine acid and hydroxylamine derivatives, while others consist of various polymeric binders, hydrocarbons and carbohydrates which are oxidized to produce non-corrosive and, often termed, "non-toxic" gases. However, there some disadvantages to the use of such non-azide fuel materials. For example, the gas products produced from burning these type fuels sometimes produce unacceptably high levels of carbon monoxide, carbon dioxide and water for their use in automobile air bag applications.

Typical oxidizers conventionally used in prior art gas generant compositions are: (1) ammonium nitrate, and alkali and alkaline earth metal nitrite and nitrates, such as $KNO_3$ and $Sr(NO_3)_2$, (2) ammonium oxalate and various metallic oxides, mixed oxides and bi-metallic complex oxides, based on such cations as Al, Ti, Cr, Mn, Fe, Co, Ni, Cu, Zn, Nb, Mo, Pd, Sn, Ce, Ta, W and Pb, (3) various metallic halides, including fluorides, chlorides and iodides, such as $FeF_3$ and $CrCl_3$, as well as various organic chlorides and iodides, (4) ammonium perchlorate, and alkali metal chlorates and perchlorates, such as $KClO_4$, (5) various inorganic sulfides, such as $MoS2$, and sulfur and (6) various other inorganic peroxides, permanganates, chromates and dichromates; as exemplified in U.S. Pat. Nos. 2,981,616; 3,468,730; 3,741,585; 3,719,604; 3,734,789; 3,814,694; 3,898,112; 3,904,221; 3,909,322; 3,931,040; 3,947,300; 3,996,079; 4,062,708; 4,203,787; 4,243,443; 4,370,181; 4,376,002 and 4,734,141.

In contrast to the above discussed prior art, it has now been discovered that gas generant compositions can be improved by using inorganic compounds containing poly(nitrito) transition metal complex anions as oxidants for the gas producing fuel material, whether azides or non-azides, especially the latter.

SUMMARY OF THE INVENTION

In accordance with the present invention improved solid, gas generating compositions are provided including a fuel (i.e. source of nitrogen-containing gas) and an oxidizer therefor, wherein the improvement comprises using as the oxidant an inorganic compound having a poly(nitrito) transition metal complex anion.

In accordance with the present invention, the inorganic oxidant compounds are generically represented by the formula:

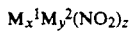

$$M_x^1 M_y^2 (NO_2)_z$$

where $M^1$ is a metal selected from the alkali metals of Group IA, preferably sodium and most preferably potassium, the alkaline earth metals of Group IIA, most preferably strontium, Group IB metals, preferably copper, and Group IIB metals, preferably zinc, of the Periodic Table; $M^2$ is a metal selected from the transition metals of Groups IVA–IIB of the Periodic Table, most preferably cobalt; x=1, 2, 3 or 4; y=1 or 2 and z=4 or 6, as determined by the required stoichiometry of the metals of the complex, and the $M^1$ and $M^2$ metal must not be the same metal. $M^1$ is preferably an alkali metal, most preferably potassium. Potassium hexanitrocobaltate, $K_3Co(NO_2)_6$, is the most preferred example of an oxidizer.

In accordance with the present invention the fuel component of the solid gas generant composition may be either an azide or a non-azide, preferably the latter. Also, as is conventional, such compositions may optionally contain a binder, such as polypropylene carbonate, as is conventional, in amounts up to about 5 wt%.

In accordance with the present invention there is also provided a method for generating nitrogen rich gas by igniting a gas generant composition containing a fuel, and an oxidizer having a transition metal nitrito complex, as above described.

Further provided in accordance with this invention is a method of inflating an air bag by using the nitrogen rich gas as produced from igniting the gas generant composition including the metal nitrito complex oxidizer, as above described.

Also in accordance with this invention a conventional air bag inflator system is provided comprising a metal housing having a gas generant composition including a novel oxidant as above described, along with an igniter therefor and a filtering system for the gas.

Other objects and advantages of the present invention will become apparent to those skilled in the art from the following detailed description and appended claims.

BRIEF DESCRIPTION OF THE DRAWINGS

FIG. 1 illustrates in graph form performance data points of potassium diliturate and strontium nitrate outlined in Example 2.

FIG. 2 illustrates in graph form performance data points of potassium diliturate and potassium hexanitrocobaltate outlined in Example 3.

DETAILED DESCRIPTION OF THE PREFERRED EMBODIMENTS

The principal aspect of this invention relates to solid gas generant or propellant compositions containing as essential ingredients: (1) a gas generating fuel and (2) an oxidizer therefor, wherein the oxidizer comprises an inorganic compound having a poly(nitrito) transition metal complex anion. This complex anion may be associated with any stable cation having a valence of up to two chosen from the metals of Group IA, the alkaline earth metals of Group IIA and the metals of Group IB and IIB of the Periodic Table, as long as the cation is a different metal than the complex anion transition metal. The inorganic oxidant compounds (salts) according to the invention may be represented by the following formula:

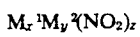

$$M_x^1 M_y^2 (NO_2)_z$$

wherein (1) $M^1$ is a metal selected from the (a) Group IA alkali metals, preferably sodium and most preferably potassium, (b) Group IIA alkaline earth metals, preferably strontium, (c) Group IB metals, preferably copper, and (d) Group IIB metals, preferably zinc, of the Periodic Table (published by Sargent-Welch Scientific Co., catalogue no. S-18806-10,1979 copyright) (2) $M^2$ is a metal selected from the transition metals of IVA–IIB of the Periodic Table, preferably the Group VIIIA, IB and IIB metals, more preferably cobalt, copper and zinc from these respective Groups, and most preferably cobalt, (3) x=1, 2, 3 or 4; y=1 or 2; and z=4 or 6 as determined by the required stoichiometry of the metals of the complex, and (4) the $M^1$ and $M^2$ metals selected are different metals. $M^1$ is preferably an alkali or alkaline earth metal, most preferably potassium. The most preferred oxidizer salt is potassium hexanitrocobaltate, $K_3Co(NO_2)_6$.

A secondary aspect of the present invention relates to combining the above described novel oxidizers (2) with conventional propellant fuel (1) which generants nitrogen-containing gas, which may be either an azide, for example $NaN_3$, as is well known; or preferably a non-azide, the most preferred of which is potassium diliturate (KDL), $C_4H_2N_3OK$. Examples of other non-azide fuels are bis(5-aminotetrazole)Zn (ZnAT), $C_2H_4N_{10}Zn$, and potassium nitroorotate, $C_5H_4N_3OK$.

The use of oxidizers (2) having poly(nitrito) transition metal complex anions, e.g. $K_3Co(NO_2)_6$, has been demonstrated with non-azide gas generator fuels, e.g. $C_4H_2N_3O_5K$ and $C_2H_4N_{10}Zn$, found to support combustion with a reasonable burning rate as shown in Example 1A and 1B, respectively. The potassium salt of the $Co(NO_2)_6^{-3}$ complex is preferred because it is neither water soluble nor hydroscopic. These properties, i.e. water insoluble and anhydrous, prevent excessive introduction of moisture into the formulation. Potassium hexanitrocobaltate has a low heat of formation which results in significantly lower flame temperatures for the propellants when this material is used as a substitute for the more conventional oxidizer, $Sr(NO_3)_2$. Examples 2 and 3 illustrate this with the non-azide fuel, potassium diliturate (KDL). Preferred alternate transition metal nitrito complexes useful as oxidizing agents are such salts as $M_2Cu(NO_2)_4$, $M_2Zn(NO_2)_4$ and $MCu(NO_2)_4$ where M may be, for example, the Group IA metal Li, Na or K or the Group IIA metal Mg, Ca, Sr or Ba, more preferably the Group IA metals and most preferably K. Preferred alternate oxidizing salts are potassium tetranitrocuprate, $K_2Cu(NO_2)_4$, and potassium tetranitrozincate, $K_2Zn(NO_2)_4$.

The oxidant component (2) in the gas generant composition may comprise mixtures of various novel oxidant compounds under the generic formula above. And such novel oxidizers, whether singly or in admixture, are intended to replace completely typical oxidizers, e.g. $Sr(NO_3)_2$, used in propellant compositions. However, if desired, the oxidizers according to the invention may be partially substituted for such known oxidizers in any amount from 1-99%, preferably greater than 50%, by weight, especially when destined for less severe use than vehicle crash bags.

According to the invention a typical non-azide fuel and novel oxidizer reaction is represented by the following equation:

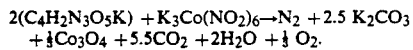

$$2(C_4H_2N_3O_5K) + K_3Co(NO_2)_6 \rightarrow N_2 + 2.5\ K_2CO_3 + \tfrac{1}{3}Co_3O_4 + 5.5CO_2 + 2H_2O + \tfrac{1}{3}O_2.$$

According to the invention a typical azide fuel and novel oxidizer reaction is represented by the following equation: $19NaN_3 + K_3Co(NO_2)_6 \rightarrow 34.5N_2 + CoO + 9.5Na_2O + 1.5K_2O.$ The metal nitrito complexes useful as oxidizers in the present invention are either commercially available or are readily prepared. In general, these complexes may be made by admixing a nitrito salt of the transition metal, such as $Na_3Co(NO_2)_6$, with an alkali or alkaline earth metal salt, such as KCl, in water and recovering the natural complex as a precipitate. See Example 4. Other alkali and alkaline earth metal salts, such as the acetates, perchlorates, nitrates or tetrafluoroborates, may also be used so long as the anion does not displace the nitrito moieties of the transition metal.

The gas generant or propellant compositions of the present invention which are ignited to produce nitrogen-containing gas to inflate automobile air bags may contain, in addition to the essential oxidizer and fuel components, as above described, other conventional components commonly used in such compositions. For example, mixtures of the essential fuel and oxidizer ingredients can be pressed into cohesive pellets, tablets or wafers which are sometimes sufficiently rugged for use in an air bag generator without a binder component being present. However, it is usually necessary to provide a small proportion of a binder therewith, typically from 0.1 to 5 wt.%, preferably about 1-2 wt.%. Examples of binders contemplated herein, are polypropylene carbonate (PPC), $MoS_2$ (as shown in Example 1), polyethers or mixtures thereof; as similarly taught in aforementioned U.S. Pat. Nos. 4,203,787; 4,370,181 and 4,547,235. Other ingredients may also be used in the propellant compositions, such as $SiO_2$ and $Al_2O_3$ in typical amounts and for the known residue control purposes taught, for example, in U.S. Pat. Nos. 3,912,561; 3,947,300; 4,547,235 and 4,865,667. Additional ingredients in the composition should be minimized, particularly inert ingredients which do not contribute to the volume of nitrogen rich gas generated or which may introduce deleterious combustion products therein. One exception, however, may be burn rate enhancers or boosters, such as heating fibers (e.g. graphite or iron fibers, etc.) dispersed in the composition matrix in small amounts of less than 6 wt.%, preferably less than 1 wt.%, which serve to increase the burn rate of the propellant by transferring heat during combustion, as is well known in the art; see, for example U.S. Pat. No. 4,696,705.

When the fuel component of the gas generant composition is a non-azide, as is preferred, its content can range from about 30 to 50% by wt. based on the total weight of the composition, preferably from about 35 to 45 wt.%, most preferably about 40 wt.%, and thus the oxidizer component making up the balance of the propellant composition invention can range from about 50 to 70% by wt. based on the total weight of the composition, preferably from about 55 to 65 wt.%, and most preferably about 60 wt.%.

When an azide is used as the fuel, instead of a non-azide, less of the novel oxidizer is required, generally on the order of about 20-40% by wt.

Hence when the fuel is an azide, the content of the novel oxidizer can range from about 15 to 50% by wt. based on the total weight of the composition, preferably from about 20 to 40 wt.%, most preferably about 25 wt.%, with the fuel making up the balance of the composition; thus ranging from about 50 to 85% by wt., preferably from about 60 to 80 wt.%, and most preferably about 75 wt.%.

The final gas generant compositions of the present invention as used in air bag restraint systems may be prepared by conventional techniques. For example, the essential ingredients of the composition, including a fuel (such as potassium diliturate) and an oxidizer (such as potassium hexanitrocobaltate), may simply be blended together to form a homogeneous mixture, along with other optional ingredients, such as a binder, as above discussed. In normal commercial use the gas generant composition is then pelletized or made into tablet or wafer form.

Another aspect of the invention involves a method of generating nitrogen rich gas for general use by igniting the composition of the invention previously described.

Another aspect of the invention involves using the nitrogen rich gas thus produced from the composition of the invention above described to inflate air bags in a wide variety of well known gas generator mechanisms as earlier discussed, particularly in an automotive air bag restraint system comprising a metal housing having a gas outlet; tablets or wafers of the gas generating composition as previously described disposed within the housing; an igniter disposed within the housing adjacent to the gas generating composition; and a gas filtering system disposed between the propellant composition and the gas outlet of the metal housing. More specific details and illustration of an exemplary type of inflator system contemplated herein are found in aforementioned U.S. Pat. Nos. 4,296,084 (which is incorporated herein by reference in its entirety) and U.S. Pat. 4,931,112.

The following examples serve to further illustrate the present invention, and are not intended to limit the invention in any manner. All percentage used in the following examples, and throughout this specification, are percent by weight unless specified otherwise.

EXAMPLE 1

A. This example illustrates the use of potassium hexanitrocobaltate, $K_3Co(NO_2)_6$ as an oxidizer with potassium diliturate (KDL), $C_4H_2N_3O_5K$, as the fuel, together with polypropylene carbonate (PPC) or molybdenum disulfide ($MoS_2$). Burning rates in inches/sec at 1000 psi pressure are given in the following table.

| Percent Oxidizer | Percent KDL Fuel | Percent PPC | Percent MoS₂ | Burning Rate (ips) |
|---|---|---|---|---|
| 50 | 48 | — | 2.0 | 0.337 |
| 50 | 48 | 2.0 | — | 0.385 |
| 50 | 48 | 2.0 | — | 0.372* |

*composition processed with acetone rather than water.

The above data illustrate that useful and reproducible burning rates may be obtained with the novel oxidizer when blended with the non-azide fuel, KDL.

B. In the following example, the bis (5-aminotetrazole) complex of zinc (ZnAT), $ZnC_2H_4N_{10}$, was employed as the non-azide gas generating fuel with the novel oxidizer. Burning rates are reported at 1000 psi in inches per second.

| Percent Oxidizer | Percent ZnAT Fuel | Percent PPC | Burning Rate (ips) |
|---|---|---|---|
| 58.4 | 39.6 | 2.0 | 0.651 |
| 58.4 | 39.6 | 2.0 | 1.127* |

*formulation processed with acetone rather than water.

The above data suggest that high burning rates may be obtained with the novel oxidizer. In this case, waterless processing resulted in very high burn rates being obtained relative to those from the water processed formulation.

EXAMPLE 2

This example shows supporting data for performance properties of potassium diliturate when used with the well known oxidizer, strontium nitrate.

| Composition | Potassium Diliturate $C_4H_2N_3O_5K$ | | | | | | |
|---|---|---|---|---|---|---|---|
| Hf Kcal/Mole | −247 Kcal/Mole | | | | | | |
| Fuel (%) | 52.5 | 52 | 50 | 48 | 45 | 41 | 37.4 |
| Sr(NO3)2 (%) | 47.5 | 48 | 50 | 52 | 55 | 59 | 62.6 |
| Temperature K | 2000 | 1959 | 1885 | 1801 | 1658 | 1443 | 1244 |
| Gas Product (wt %) | | | | | | | |
| CO2 | 65 | 64 | 61 | 60 | 56 | 52 | 65 |
| H2O | 7 | 7 | 7 | 7 | 7 | 6 | 2 |
| N2 | 28 | 28 | 28 | 28 | 28 | 28 | 28 |
| O2 | 0 | 1 | 3 | 6 | 9 | 14 | 20 |
| CO ppm | 0 | 0 | 0 | 0 | 0 | 0 | 0 |
| Yield (wt %) | 60 | 60 | 59 | 58 | 58 | 58 | 55 |
| *Volume Ratio (%) | 125 | 124 | 124 | 124 | 123 | 122 | 120 |
| Solids (Weight %) | | | | | | | |
| Sr(OH)2 | 23 | 24 | 24 | 26 | 27 | 29 | 20 |
| SrO | | | | | | | |

*volume ratio is gas volume relative to conventional azide gas generator formulation.

This data is depicted in graph form as FIG. 1.

EXAMPLE 3

This example shows supporting data for performance properties of potassium diliturate when used with the novel oxidizer, potassium hexanitrocobaltate.

| Composition | Potassium Diliturate | | | $C_4H_2N_3O_5K$ w/$K_3CoY_6$ | | |
|---|---|---|---|---|---|---|
| Hf Kcal/Mole | −247 Kcal/Mole | | | −526 Kcal/Mole | | |
| Fuel (5) | 50 | 49 | 45 | 37 | 34.6 | 33 |
| K3Co(NO2)6 (%) | 50 | 51 | 55 | 63 | 65.4 | 67 |
| Temperature K | 1674 | 1655 | 1458 | 1165 | 1032 | 944 |
| Gas Product (Wt %) | | | | | | |
| CO2 | 55 | 54 | 49 | 37 | 33 | 31 |
| H2O | 8 | 8 | 8 | 7 | 6 | 6 |
| N2 | 37 | 37 | 38 | 40 | 40 | 41 |
| O2 | 0 | 1 | 5 | 16 | 20 | 22 |
| CO ppm | 5980 | 0 | 0 | 0 | 0 | 0 |
| NO ppm | 0 | 20 | 20 | 0 | 0 | 0 |
| YIELD (Wt. %) | 52 | 52 | 50 | 48 | 47 | 47 |
| *Volume Ratio (%) | 119 | 119 | 123 | 122 | 121 | 121 |
| Solids (Weight %) | | | | | | |
| CoO | 8.3 | 8.4 | 0.0 | 0.0 | 0 | 0.0 |
| Co3O4 | 0 | 0 | 10 | 11 | 12 | 12 |
| K2CO3 | 39 | 39 | 40 | 41 | 41 | 42 |

*volume ratio is gas volume relative to conventional azide gas generant formulation.

This data is depicted in graph form as FIG. 2.

Example 3 demonstrates that potassium hexanitrocobaltate, when combined with the fuel potassium diliturate, has a low heat of formation which results in significantly lower flame temperatures for the propellants when this material is used as a substitute for the more typical oxidizer, strontium nitrate, as shown in Example 2.

Further comparison of the data from Examples 2 and 3 reveals that use of the novel oxidizer, in addition to providing much lower flame temperatures than the ordinary oxidant, strontium nitrate, produces equivalent gas yields on a volume basis, which is the figure of merit. This is a result of substantially increased nitrogen yield due to use of the novel oxidizer relative to that obtained with the strontium nitrate, accompanied by decreased $CO_2$ yield. The merits of improved nitrogen gas yields have been discussed earlier.

FIGS. 1 and 2 illustrate the overall cooling trend of the flame temperature resulting from formulating at excess oxidizer levels with either oxidizer and further serve to illustrate that a wide range of gas compositions with flame temperatures below 1500 degrees Kelvin may be achieved with the novel oxidizer. This property allows the generating composition to provide a cool gas product with sufficient oxygen content to prevent excessive carbon monoxide concentrations to be formed in the gas products yet not produce so much excess oxygen as to be rendered excessively reactive towards the secondary components of the gas generating/inflation device.

EXAMPLE 4

This example illustrates the preparation of potassium hexanitrocobaltate, $K_3Co(NO_2)_6$, from sodium hexanitrocobaltate, $Na_3Co(NO_2)_6$, which is commercially available.

5g of $Na_3Co(NO_2)_6$ was dissolved in 100 ml of $H_2O$.
5g of KCl was separately dissolved in 100 ml of $H_2O$.

These two solutions were mixed together and an immediate precipitate formed. The precipitate was collected via filtration through a glass frit filter funnel.

The solid product was recovered, analyzed and found to contain: K=21.96%, Co=11.96%, N=14.2%, C=0.10%, H=0.48%, Na=0.13%.

The yield was 3.542g, a 63.16% yield.

EXAMPLE 5

This example illustrates the use of the ZnAT fuel with several oxidizers for comparative purposes. All formulations were processed as water slurries with PPC binder.

| Oxidizer | Percent Oxidizer | Percent Fuel | *Binder Percent | Burning Rate ips @ 1000 psi | Burning Rate ips @ 1600 psi |
|---|---|---|---|---|---|
| $Sr(NO_3)_2$ | 54.9 | 43.1 | 2.0 | 0.461 | 0.598 |
| $KNO_3$ | 40.9 | 57.1 | 2.0 | 0.565 | 0.640 |
| $K_3Co(NO_2)_6$ | 58.4 | 39.6 | 2.0 | 0.651 | 1.392 |

*PPC

The above data show that increased burning rates and pressure sensitivity result from use of the novel oxidizer with this fuel. This characteristic is advantageous for gas generator applications since high combustion rates are desirable for rapid device deployment without resorting to complex, high surface area generator grain designs.

While the invention has been described in terms of certain preferred embodiments, modifications obvious to one having ordinary skill in the art may be made without departing from the scope of the present invention.

Various features of the invention are set forth in the following claims.

We claim:

1. A solid composition for generating a nitrogen-containing gas including a fuel and an oxidizer therefor, wherein said oxidizer comprises an inorganic compound having a poly(nitrito) transition metal complex anion.

2. A composition according to claim 1 wherein the cation for the oxidizer compound comprises a metal selected from the group consisting of the alkali metals of Group IA, the alkaline earth metals of Group IIA and the metals of Group IB and IIB of the Periodic Table so long as said cation is not the same metal as the complex anion transition metal.

3. A composition according to claim 2 wherein the cation selected is an alkali or alkaline earth metal.

4. A composition according to claim 2 wherein the cation selected is an alkali metal.

5. A composition according to claim 4 wherein said alkali metal is potassium.

6. A composition according to claim 2 wherein the oxidizer compound is represented by the formula $$M^1_x M^2_y (NO_2)_z$$

wherein:
$M^1$ = a metal selected from the group consisting of the alkali metals of Group IA, the alkaline earth metals of Group IIA and the metals of Group IB and IIB of the Periodic Table,
$M^2$ = a metal selected from the group consisting of the transition metals of Groups IVA–IIB of the Periodic Table,
x=1, 2, 3 or 4; y=1 or 2; z=4 or 6
and wherein x, y and z are determined by the identity of $M^1$ and $M^2$ and the stoichiometries required to provide the neutral complex, and wherein the $M^1$ and $M^2$ metals selected are different metals.

7. A composition according to claim 6 wherein $M^2$ is a Group VIIIA, IB or IIB metal.

8. A composition according to claim 6 wherein $M^1$ is selected from sodium and potassium in the Group IA metals and strontium in the Group IIA metals.

9. A composition according to claim 8 wherein $M^2$ is a Group VIIIA, IB or IIB metal.

10. A composition according to claim 9 wherein $M^2$ is a Group VIIIA metal.

11. A composition according to claim 10 wherein the Group VIIIA metal is cobalt.

12. A composition according to claim 9 wherein $M^2$ is a Group IB metal.

13. A composition according to claim 12 wherein the Group IB metal is copper.

14. A composition according to claim 9 wherein $M^2$ is a Group IIB metal.

15. A composition according to claim 14 wherein the Group IIB metal is zinc.

16. A composition according to claim 9 wherein the Group IIA metal is strontium.

17. A composition according to claim 9 wherein the Group IA metal is sodium.

18. A composition according to claim 9 wherein the Group IA metal is potassium.

19. A composition according to claim 18 wherein the oxidizer compound is potassium hexanitrocobaltate, $K_3Co(NO_2)_6$.

20. A composition according to claim 18 wherein the oxidizer compound is potassium tetranitrocuprate, $K_2Cu(NO_2)_4$.

21. A composition according to claim 18 wherein the oxidizer compound is potassium tetranitrozincate, $K_2Zn(NO_2)_4$.

22. A composition according to claim 1 wherein the fuel is selected from an azide and a non-azide.

23. A composition according to claim 22 wherein said fuel is a non-azide.

24. A composition according to claim 23 wherein said non-azide is potassium diliturate, $C_4H_2N_3O_5K$.

25. A composition according to claim 24 wherein the oxidizer compound is potassium hexanitrocobaltate, $K_3Co(NO_2)_6$.

26. A composition according to claim 23 wherein said non-azide is Zn (5-aminotetrazole)$_2$, $C_2H_4N_{10}Zn$.

27. A composition according to claim 26 wherein the oxidizer compound is potassium hexanitrocobaltate, $K_3Co(NO_2)_6$.

28. A composition according to claim 23 wherein said non-azide is potassium nitroorotate, $C_5H_4N_3O_7K$.

29. A composition according to claim 28 wherein the oxidizer compound is potassium hexanitrocobaltate, $K_3Co(NO_2)_6$.

30. A method of generating nitrogen-containing gas comprising the step of igniting a composition including a fuel, and an oxidizer therefor, wherein said oxidizer comprises an inorganic compound having a poly(nitrito) transition metal complex anion.

31. A method according to claim 30, wherein the gas produced is used to inflate an air bag.

* * * * *

UNITED STATES PATENT AND TRADEMARK OFFICE
CERTIFICATE OF CORRECTION

PATENT NO. : 5,160,386

DATED : November 3, 1992

INVENTOR(S) : Lund et al.

It is certified that error appears in the above-identified patent and that said Letters Patent is hereby corrected as shown below:

Column 5, line 17, of patent where -- and -- should have been inserted before "found".

Column 5, line 32, of patent where "MCu(NO2)4" should read -- $MCu(NO_2)_4$ --.

Column 10, line 25, of patent where -- the group consisting of -- should be inserted before "sodium".

Column 12, line 8, of patent where the "," (first occurrence) should have been deleted.

Signed and Sealed this

Twenty-ninth Day of March, 1994

BRUCE LEHMAN

Attest:

Attesting Officer

Commissioner of Patents and Trademarks